United States Patent [19]

Petro

[11] Patent Number: 5,752,811
[45] Date of Patent: May 19, 1998

[54] LINEAR ACTUATOR MECHANISM FOR CONVERTING ROTARY TO LINEAR MOVEMENT INCLUDING ONE END PULLEY LINE ATTACHED TO THE STATIONARY ANCHOR AND OTHER END ATTACHED TO THE TAKE-UP DRUM

[76] Inventor: John P. Petro, 2660 3rd St., San Francisco, Calif. 94107

[21] Appl. No.: 749,850

[22] Filed: Nov. 15, 1996

[51] Int. Cl.⁶ .......................... F04B 49/06; F16H 55/32; F16H 7/08
[52] U.S. Cl. .......................... 417/416; 417/362; 74/37; 74/27; 74/89.22
[58] Field of Search .......................... 417/218, 212, 417/362, 416, 417, 470; 74/37, 27, 89.22

[56] References Cited

U.S. PATENT DOCUMENTS

| | | |
|---|---|---|
| 1,631,316 | 6/1927 | Ford . |
| 2,911,835 | 11/1959 | Smith .......................... 74/37 |
| 3,044,312 | 7/1962 | Hall et al. .......................... 74/89.22 |
| 3,273,408 | 9/1966 | Nagel et al. .......................... 74/37 |
| 3,514,017 | 5/1970 | Malone . |
| 3,620,266 | 11/1971 | Ryder . |
| 3,804,370 | 4/1974 | Woodard .......................... 74/89.22 |
| 4,089,624 | 5/1978 | Nichols . |
| 4,099,597 | 7/1978 | Powell . |
| 4,556,141 | 12/1985 | Faitel .......................... 74/37 |
| 4,595,495 | 6/1986 | Yotam . |
| 4,721,432 | 1/1988 | Cargill .......................... 74/37 |
| 4,830,331 | 5/1989 | Vindum . |
| 4,904,161 | 2/1990 | Kamide et al. .......................... 417/218 |
| 5,342,176 | 8/1994 | Redlich .......................... 417/212 |
| 5,415,533 | 5/1995 | Egger . |

*Primary Examiner*—Timothy Thorpe
*Assistant Examiner*—Samamtha H. Moon
*Attorney, Agent, or Firm*—Bielen, Peterson, Lampe

[57] ABSTRACT

A linear actuator and pump unit for precision displacement of fluids in which a positive displacement, piston pump is coupled to an actuator mechanism having a carriage on a guide that is displaced by a rotary drive connected to a take-up drum on an anchor structure that has a pulley line anchored to the anchor structure looped around a first idler pulley on the carriage, looped around an idler pulley on the anchor structure, looped around a second anchor structure on the carriage, and connected to the take-up drum, the positioning of the carriage being detected by a sensor and the rotary drive that controls the precision operation of the piston pump.

20 Claims, 1 Drawing Sheet

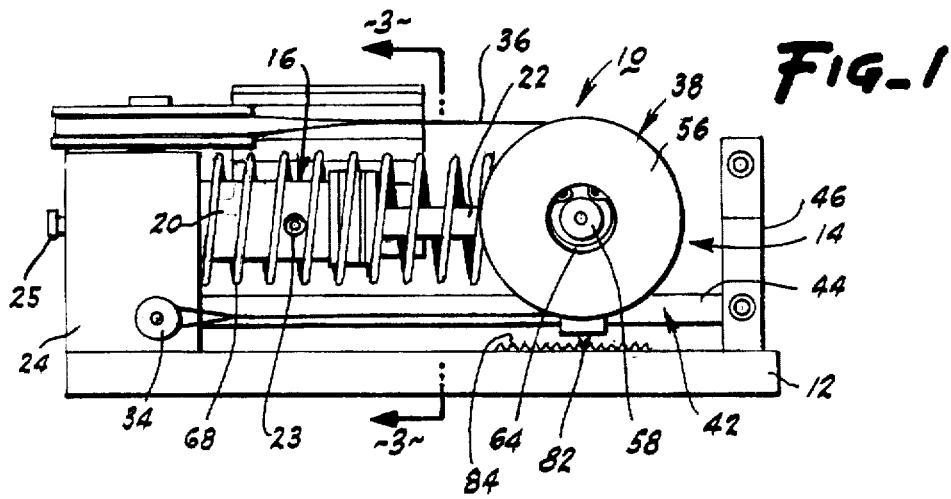
FIG_1
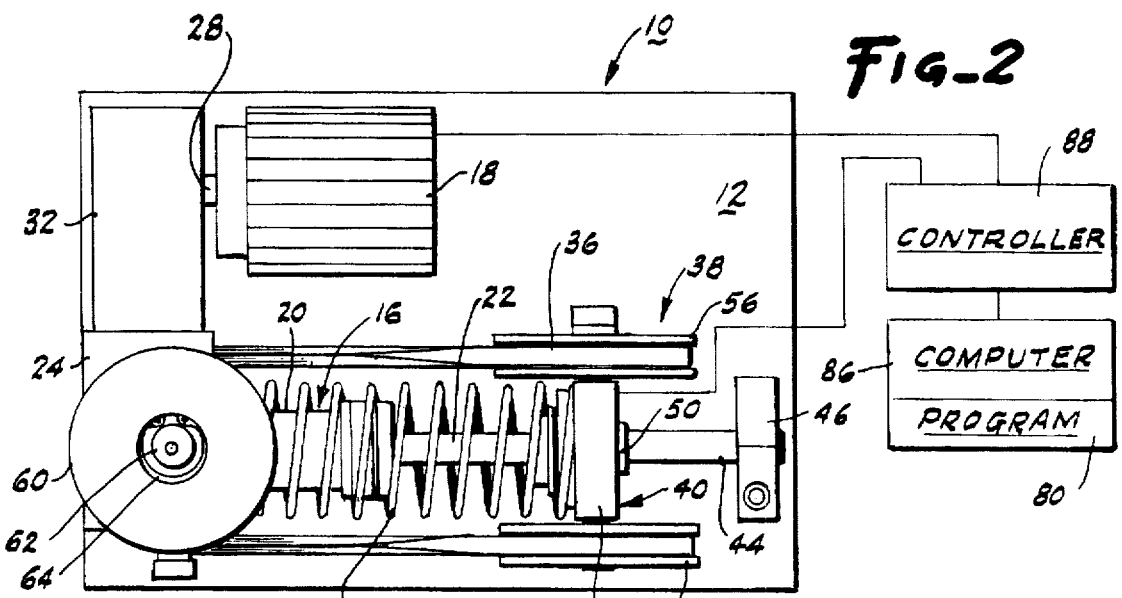
FIG_2
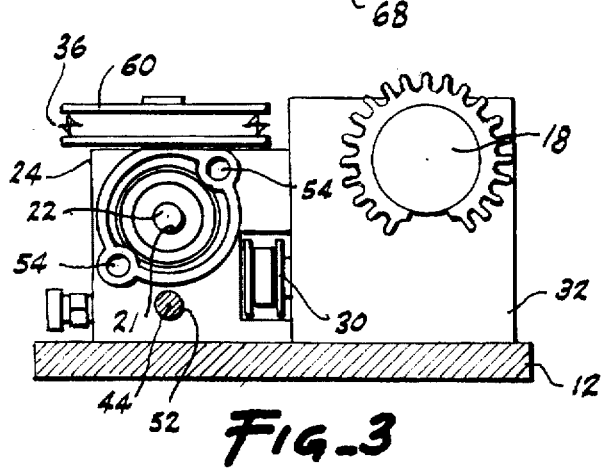
FIG_3
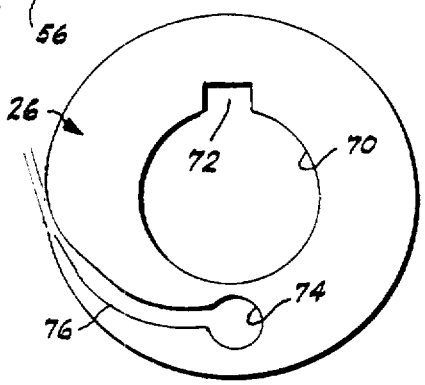
FIG_4

LINEAR ACTUATOR MECHANISM FOR CONVERTING ROTARY TO LINEAR MOVEMENT INCLUDING ONE END PULLEY LINE ATTACHED TO THE STATIONARY ANCHOR AND OTHER END ATTACHED TO THE TAKE-UP DRUM

BACKGROUND OF THE INVENTION

This invention relates to a precision piston pump. In particular, this invention relates to an actuator mechanism and control system for a positive displacement piston pump. The actuator mechanism and control system are designed to enable the piston pump to deliver a controlled flow of fluid. Such pumps are commonly used for fluid delivery to analytical instruments. Frequently operated as constant volume pumps, such precision piston pumps are designed to deliver precise quantities or flow rates of fluid to a collateral system. Under control of an appropriate control system, the precision piston pump can deliver fluids under constant pressure.

Prior art designs of precision pumps rely upon precise mechanical actuating mechanisms to advance a piston or plunger in a chamber. One such mechanism comprises a precisely machined screw for mechanically changing angular displacements to linear displacements of the piston or plunger. As control programs for operating the pump systems have become more sophisticated, mechanical systems can operate with computer controlled corrections for delivering precision controlled volumes or rates of fluid flow with less expensive components.

It is a primary object of this invention to provide a linear actuator mechanism for a precision piston pump that is inexpensive to manufacture and that has displacement characteristics, which are repeatable, enabling reference mapping and conformance correction by a control program. The control program can be implemented by a general purpose computer that provides an operating interface to a user and connects to a controller adapted to the hardware selected to effect the operation.

It is another object of this invention to provide a linear actuator mechanism that translates measured rotary motion into measured linear motion. In the environment of a precision, positive displacement pump, this enables precise quantities or flow rates of fluids to be delivered from the pump, typically to an analytical instrument.

The linear actuator mechanism is designed for use in high load, linear displacements, typically for high pressure fluid systems with minimum distortion of calculated measurements resulting from the mechanical components.

SUMMARY OF THE INVENTION

The actuator mechanism of this invention is particularly useful in combination with a precision positive-displacement pump. The actuator mechanism converts an angular input to a linear output and utilizes an inexpensive mechanism with repetitive distortion enabling compensation correction by a control program for precision operation.

The actuator mechanism is connected to a drive motor, preferably a stepping motor, for convenient controlled angular displacement, and includes a displaceable carriage connected to the moving element of a piston and cooperating cylinder barrel pump.

Conversion of the angular motion of the drive motor to the linear motion of the carriage is accomplished by a pulley assembly that interconnects the moveable carriage with a stationary anchor structure. The pulley assembly is arranged to provide a transfer of displacement forces to multiple points on the carriage, which are symmetrically located with respect to the central axis of the displaceable element of the piston pump. In this manner the piston and cylinder barrel are maintained in alignment for minimizing friction and wear.

The actuator mechanism utilizes the drive motor to effect the controlled displacement of the carriage and a return spring to return the carriage to its initial position. A control program implemented by a general purpose computer provides the operating instructions for the drive motor. Error correction is accomplished by use of data from a sensor on the carriage which detects the measured, incremental displacements of the carriage and compares the carriage displacements with the angular displacements of the motor during a linear displacement cycle of the carriage. By appropriate cycle mapping, the relative displacement characteristics of the drive motor and carriage are determined, providing the reference base for controlled operation by the control program.

It is contemplated that the control program in conjunction with the general purpose computer will provide the user interface for operation of the system in a customary manner. Where electronically operated components are not directly controllable or interfaceable with the general purpose computer, an intermediate controller between the computer and the actuator and pump unit is required. The controller converts digital data from the computer to the appropriate electronic signals to the actuator and pump unit and feeds digital data to the computer from sensors and the like on the actuator and pump unit.

It is to be understood that the novel actuator mechanism of this invention can be utilized in other environments similar to a precision piston pump. Furthermore, other equivalent components and elements may be substituted in the system described.

BRIEF DESCRIPTION OF THE DRAWINGS

FIG. 1 is a side elevational view of an actuator and pump unit showing the actuator mechanism of this invention.

FIG. 2 is a top plan view of the actuator and pump unit of FIG. 1 with the control system shown schematically.

FIG. 3 is a cross sectional view taken on the lines 3—3 in FIG. 1.

FIG. 4 is an enlarged side elevational view of the take-up drum showing a preferred construction.

DETAILED DESCRIPTION OF THE PREFERRED EMBODIMENTS

Referring to the drawings, the invented actuator mechanism for a precision, positive-displacement pump, is shown in the actuator and pump unit in FIG. 1, designated generally by the reference numeral 10. The actuator and pump unit 10 has a common base platform 12 for supporting both the actuator mechanism 14 with an integral piston pump 16, and a suitable drive motor 18. The actuator mechanism 14 of this invention may be used in other devices for precision linear displacement. The mechanism 14 is shown in its preferred configuration with the piston pump 16 for delivery of a controlled flow of fluid to an auxiliary component, such as an analytical instrument (not shown).

The piston pump 16 is a simple positive displacement system with a cylinder barrel 20 and a piston 22 that enters a cylinder 21, as shown in FIG. 3, within the cylinder barrel and displaces a volume in the cylinder as the piston is advanced. The precision piston pump 16 is typically used for high pressure transport of fluid and the cylinder barrel 20 has a fluid supply port 23 and delivery port 25, for controlled fluid flow to the auxiliary component. The piston 22 moves relative to the cylinder barrel 20 requiring either the cylinder barrel or the piston to remain stationary while the other cooperative element is displaced. In the embodiment of FIGS. 1–3, the cylinder barrel 20 is stationary and mounted to an anchor block 24. The anchor block 24 is securely mounted to the base platform 12 and provides a stable structure for supporting various other elements of the actuator mechanism and piston pump.

As shown in the cross sectional view of FIG. 3, the anchor block supports a take-up drum 26 that is connected to the output shaft 28 of the drive motor 18 through the output shaft 30 of a speed reducer 32 coupled to the drive motor and mounted on the base platform 12. On the opposite side of the anchor block 24 is mounted an anchor post 34. One end of a pulley line 36 is connected to the take-up drum 26 and the other end of the pulley line 36 is connected to the anchor post 34. Preferably, the pulley line 36 comprises a thin flat belt looped around a pulley assembly 38 on a displaceable carriage 40. The carriage 40 carries the piston 22 and is connected to a carriage way 42 for limited linear displacement. The carriage way 42 includes a way member in the form of a guide shaft 44 which is supported at opposite ends by a stop structure 46 and the anchor block 24. The cylindrical guide shaft 44 has an axis that defines the linear travel of the carriage 40. The carriage is formed by a carriage block 48 having a bearing 50 that slideably engages the guide shaft 44 and, together with the engagement of the piston 22 with the cylinder barrel 20, maintains the orientation of the carriage 40. Travel is limited in one direction by the cylinder barrel 20 and in the other direction by stop structure 46.

Where more stability than a single way member 44 is desired, for example, in an environment where a piston does not contribute to stability, the carriage way 42 may include multiple way members. In the cross sectional view of FIG. 3, the anchor block 24 is shown with alternate sockets for different configurations of the carriage way 42. For example, a socket 52 is shown with the shaft 44 of the carriage way 42 of FIGS. 1–3. Alternate sockets 54 are provided for alternate configurations of the actuator mechanism 14 as may be required by a particular use.

The design of the pulley assembly 38 is directed to balancing the forces applied to the carriage 40 with reference to the central axis of the piston 22. In this manner, the piston entry into the cylinder barrel is not skewed or canted to cause undesirable friction and wear. This is best accomplished by a pair of pulleys 56 mounted on journals 58 having a common axis transverse to the central axis of the piston 22. With the diameter of the pulleys 56 approximately equal to the separation distance on the common axis, four lines of force, equidistant from the central axis of the piston 22 are created. To effect this result, the take-up drum 26 and the anchor-post 34 are positioned low on the anchor block 24, and a return pulley 60 having a diameter substantially equal to the carriage pulleys 56, is mounted on top of the anchor-post 24 on a journal 62 with an axis displaced from, but transverse to the common axis of the carriage pulleys 56.

The three idler pulleys, 56 and 60 are secured to their respective journals 58 and 62 by c-clips 64.

To insure that the pulley line 36 is under tension during take-up and that the carriage 40 is returned to its start position after take-up, a compression spring 68 is located around the piston 22 and cylinder barrel 20, and between the carriage 40 and anchor block 24. As noted, where guide shafts are mounted in the alternate sockets 54, a pair of smaller diameter compression springs (not shown) may be used. Alternately, any type of return means may be employed, such as tension springs interconnecting the stop structure 46 and carriage 40 or elastic or pneumatic means.

Similarly, other pulley arrangements may be employed depending on the forces required and the tensile strength of the belt or cable selected for the pulley line. In the preferred operation as a positive displacement precision pump, a thin belt 36 is utilized for high strength and thin profile to minimize fatigue and limit distortion on multiple turns on the take-up drum 26.

Preferably, the take-up drum 26 for the belt 36 employed as the pulley-line has the construction as shown in the enlarged cross sectional view of FIG. 4.

The drum 26 has a shaft hole 70 with a key-way 72 for locking the drum 26 to the output drive shaft 30 of the speed reducer 32. The drum 26 also has a belt retainer hole 74 and a spiral cut 76 calculated to minimize any step effect on the first overlap of the belt.

Variations due to spiral enlargement of the take-up drum 26 by successive overlapping of the belt are compensated by a processor control program 80, shown schematically in FIG. 2. The processor control program provides the error correction necessary to precisely determine quantity and rate flows from the piston pump according to comparative measurement of motor displacement and carriage displacement.

Carriage displacement is detected by a small electromagnetic (or optical) detector 82 mounted under the carriage 40, as shown in FIG. 1, which detects ridges of a fine grating 84 on the base platform 12. Motor displacement is the preferred stepping motor 18 is determined by the count of stepping pulses fed to the motor. Where a servo motor or other motor is used, feedback from an angular displacement sensor connected to the motor output may be required for precision control of the system.

The processor control program 80 is an application program to instruct a general purpose computer 86 to perform the operations necessary to control system operation. The computer 86 is connected to a controller 88, which converts the digital signals of the computer 86 into the electronic signals necessary to power the drive motor 18 according to user input and feedback from the sensors such as the position sensor 82, which senses the actual location of the carriage 40.

Where there are substantial changes in the pressures of fluids pumped, the system includes a pressure sensor and the processor control program develops reference mapping for different pressures.

While, in the foregoing, embodiments of the present invention have been set forth in considerable detail for the purposes of making a complete disclosure of the invention, it may be apparent to those of skill in the art that numerous changes may be made in such detail without departing from the spirit and principles of the invention.

What is claimed is:

1. A linear actuator mechanism for precision displacement of a transport member by a rotary drive, the actuator mechanism comprising:

a support base;

a carriage way supported on the support base, the carriage way having opposite ends and at least one way member with a linear axis;

a carriage mounted on the carriage way with contact means for reciprocal linear travel on the carriage way, the carriage having a central axis parallel to the linear axis of the way member;

an anchor structure mounted on the support base at one end of the carriage way, the anchor structure having a pulley line with first and second ends and anchor means for anchoring one end of the pulley line and take-up means for taking up the other end of the pulley line; and pulley means mounted on the carriage for looped engagement and transport of the pulley line with the pulley line having at least a first segment connected to the anchor means and a second segment connected to the take-up means, said segments being substantially parallel to and equally distant from the central axis of the carriage for balanced application of force to the carriage, wherein the rotary drive is connectable to the take-up means and the carriage is advanced on the way by operation of the rotary drive.

2. The linear actuator mechanism of claim 1 comprising further a rotary drive rotatably connected to the take-up means.

3. The linear actuator mechanism of claim 2 wherein the rotary drive is an electric motor and the actuator mechanism has controller means for operating the rotary drive and advancing the carriage.

4. The linear actuator mechanism of claim 3 wherein the electric motor comprises a stepping motor.

5. The linear actuator mechanism of claim 3 wherein the carriage and support base have interacting sensor means for detecting the displacement of the carriage on the support base.

6. The linear actuator mechanism of claim 5 including processor means, wherein the interacting sensor means generates a signal indicative of carriage position and the processor processes the signal for precision operation of the electric motor by the controller.

7. The linear actuator mechanism of claim 6 wherein the processor means comprises a general purpose computer.

8. The linear actuator mechanism of claim 7 wherein the general purpose computer includes a control program.

9. The linear actuator mechanism of claim 1 in combination with a precision piston pump, the pump having a piston and a cylinder barrel with a cylinder, the piston and cylinder having a common axis coincident with the central axis of the carriage.

10. the linear actuator mechanism of claim 9 wherein one of the piston and the cylinder barrel is stationary and mounted to the base platform and the other of the piston and the cylinder barrel is moveable and mounted to the carriage.

11. The linear actuator mechanism of claim 2 wherein the take-up means comprises a take-up drum.

12. The linear actuator mechanism of claim 11 wherein the pulley line comprises a belt.

13. The linear actuator mechanism of claim 12 wherein the take-up drum has a configuration with a spiral cut means for minimizing the step effect of the belt on wrapping around the take-up drum.

14. The linear actuator mechanism of claim 1 wherein the pulley means mounted on the carriage comprises first and second idler pulleys having a displacement from one another with a common axis of rotation, and wherein the anchor structure includes an idler pulley having a diameter substantially equal to the displacement of the idler pulleys on the carriage and having an axis perpendicular to the common axis of the idler pulleys on the carriage.

15. The linear actuator mechanism of claim 1 comprising further, carriage return means for returning the carriage to a start position.

16. The linear actuator mechanism of claim 15 wherein the carriage return means comprises a compression spring mounted between the anchor structure and the carriage, the compression spring being compressed on advance of the carriage.

17. An actuator and pump unit comprising:

a positive displacement pump having pump means with a first stationary pump member and a second moveable pump member displaceable on a linear axis relative to the first pump member for precision pumping of fluids;

a linear actuator mechanism, the linear actuator mechanism and the positive displacement pump having a base platform supporting the linear actuator mechanism and the positive displacement pump, the base platform having a carriage way supported thereon, the carriage way having ends and having at least one way member with a linear axis, the common base platform having an anchor structure at one end of the way, the anchor structure having a pulley line with first and second ends and anchor means for anchoring one end of the pulley line and take-up means for taking up the other end of the pulley line;

the carriage way supported on the support base having opposite ends and at least one way member with a linear axis;

a carriage mounted on the way with contact means for reciprocal linear travel on the way, the carriage having a central axis parallel to the linear axis of the way member;

pulley means mounted on the carriage for looped engagement and transport of the pulley with the pulley line having at least a first segment connected to the anchor means and a second segment connected to the take-up means, said segments being substantially parallel to and equidistant from the central axis of the carriage; and rotary drive means rotatably connected to the take-up means for rotating the take-up means and displacing the carriage on the way.

18. The actuator and pump unit of claim 17 wherein the pulley means comprises first and second idler pulleys mounted on the carriage with a common axis transverse to the linear axis of the idler pulleys and an idler pulley mounted on the anchor structure, the pulley line being looped around one of the pulleys on the carriage, looped around the idler pulley on the anchor structure, and looped around the other of the pulleys on the carriage.

19. The actuator and pump unit of claim 17 wherein the rotary drive means comprises an electric motor and the linear actuator mechanism includes means for determining the displacement of the carriage on the carriage way.

20. The actuator and pump unit of claim 19 comprising further, electronic program means for precision operation of the electric motor with reference to the position of the carriage on the carriage way.

\* \* \* \* \*